US 8,451,315 B2

(12) United States Patent
Lee

(10) Patent No.: US 8,451,315 B2
(45) Date of Patent: May 28, 2013

(54) SYSTEM AND METHOD FOR DISTRIBUTED MEETING CAPTURE

(75) Inventor: Bowon Lee, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 261 days.

(21) Appl. No.: 12/956,033

(22) Filed: Nov. 30, 2010

(65) Prior Publication Data

US 2012/0133728 A1  May 31, 2012

(51) Int. Cl.
*H04N 7/15* (2006.01)

(52) U.S. Cl.
USPC ............. 348/14.08; 348/14.09; 348/14.12

(58) Field of Classification Search
CPC .................................. H04N 7/142; H04N 7/15
USPC .................... 348/14.01–14.16; 370/260–261
See application file for complete search history.

(56) References Cited

U.S. PATENT DOCUMENTS

| | | |
|---|---|---|
| 6,317,776 B1 | 11/2001 | Broussard et al. |
| 6,989,856 B2 | 1/2006 | Firestone et al. |
| 7,391,439 B2 | 6/2008 | Buchner et al. |
| 8,265,240 B2 * | 9/2012 | Langgood et al. ....... 379/110.01 |
| 2003/0215218 A1 | 11/2003 | Chang |
| 2005/0286443 A1 * | 12/2005 | McMillen et al. ............ 370/260 |
| 2006/0132596 A1 * | 6/2006 | Ahonen ..................... 348/14.09 |
| 2010/0157016 A1 | 6/2010 | Sylvain |
| 2010/0220172 A1 | 9/2010 | Michaelis |
| 2011/0093273 A1 * | 4/2011 | Lee et al. ...................... 704/270 |

FOREIGN PATENT DOCUMENTS

| | | |
|---|---|---|
| EP | 0765084 A2 | 3/1997 |
| JP | 10013803 A | 1/1998 |
| KR | 20030088298 A | 11/2003 |
| WO | WO-2010072075 A1 | 7/2010 |

OTHER PUBLICATIONS

Cutler, Ross et al,; "Distributed Meetings: a Meeting Capture and Broadcasting System"; Microsoft Research: Conference '00; 2000; pp. 1-10.

* cited by examiner

*Primary Examiner* — Melur Ramakrishnaiah
(74) *Attorney, Agent, or Firm* — Romiwa C. Akpala

(57) ABSTRACT

Embodiments of the present invention disclose a system and method for distributed meeting capture. According to one embodiment, the system includes a plurality of personal devices configured to capture video data and audio data associated with at least one operating user. A media hub includes a plurality of I/O ports and is configured to receive video and audio data from the plurality of personal devices. In addition, the media hub is configured to collect the video data and/or audio data from the plurality of personal devices and output at least one audio-visual data stream for facilitating video conferencing over a network.

15 Claims, 4 Drawing Sheets

SYSTEM AND METHOD FOR DISTRIBUTED MEETING CAPTURE

BACKGROUND

Today's video conference systems provide an interactive and effective means for remote users to participate in a meeting. Such systems typically involve the simultaneous and real-time transmission of audio and video streams that are associated with participating or active users. Furthermore, identification of active talkers from remote locations is desirable for natural communications between parties. However, providing, setting up, and maintaining video conferencing systems which allow the user to easily see and identify the active talker are often expensive and complex to implement, requiring significant user or technician effort to configure and maintain.

Some video conference systems do provide an immersive video environment where the active talker can be easily identified, but these systems also require a dedicated room that has high bandwidth requirements. Due to bandwidth limitations, many video conferencing systems have a single outbound audio and video stream from each end-point. When there are multiple people engaged in a live meeting in a room with a single out-bound connection (as one node in a multi-party video conferencing scenario), the remote participants may only see a wide-angle view of the meeting room. Because of the bandwidth limitations, this view may not provide enough facial detail of the participants in order to have their expressions easily recognizable so as provide effective communication.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
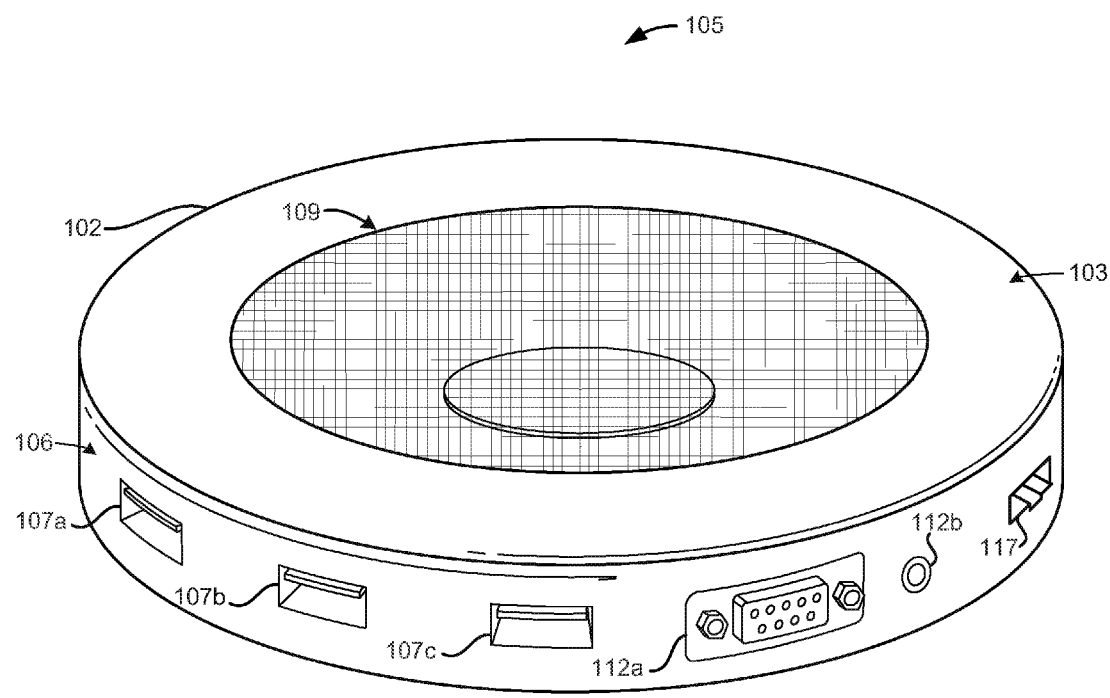
FIG. 1 is a three-dimensional perspective view of the distributed meeting capture apparatus according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Other video conferencing systems often use pan-tilt-zoom cameras and microphone arrays on a single unit attached to a display and usually pan, tilt, and zoom video cameras in the direction of the active talkers. Many systems find active talkers by source localization using a microphone array. Other systems have a structured microphone array attached to the equipment. Another type of system distributes microphone arrays in a room to localize active talkers. But in most cases, these systems do not perform well enough for practical uses due to the problem of limited viewpoints and detection errors. Again, these types of video conferencing systems often require a dedicated room and a complex configuration and set up process. For \video conferencing systems, capturing a meeting such as a round table discussion from multiple viewpoints is a challenging problem with a single camera.

According to one embodiment, the system and method includes multiple personal devices equipped with a camera/microphone and a local multimedia hub for collecting the audio and video streams output from these individual personal devices. Furthermore, the system of the present examples is configured to perform intelligent view switching based on activity levels of individual audio and video streams. In addition, a recomposed audio and/or video stream may be output from the hub for connecting to a conferencing network including external video conferencing devices. That is, examples in accordance with the present invention overcome the shortcomings of the prior methods by providing multi-viewpoint capture through utilization of individual capture means of a personal device such as notebook, tablet, or slate PC, and connecting these devices via a high speed data bus to a local multimedia hub.

Referring now in more detail to the drawings in which like numerals identify corresponding parts throughout the views, FIG. 1 is a three-dimensional perspective view of the distributed meeting capture apparatus according to an example of the present invention. As shown here, the distributed meeting capture system includes a local multimedia hub apparatus 105 configured to collect individual audio/video streams from a multitude of personal devices. The hub 105 includes a housing 102 for encompassing internal processing components of the hub. According to one embodiment, a built-in loud speaker 109 may be formed on an upper surface area 103 of the housing 102 and configured to render audio for local playback. Additionally, a plurality of input ports 111a-111c may be formed along the outer circumference or side area 106 of the housing 102. Each port 111a-111b represents a data transfer interface such as a universal serial bus (USB) interface, an IEEE 1394 interface, any other interface conducive for high bandwidth data transfer for local audio and video streaming. The hub 105 further includes local output ports 112a and 112b for outputting received audio and video data streams to an external device such as a projector screen or external loudspeaker for example. In addition, the hub 105 includes at least one communication port 117 such as an Ethernet port or the like in order to receive audio-visual data streams from remote participants utilizing a conferencing network. Accordingly, examples in accordance with the present invention help to facilitate networked video conferencing of numerous participants having separate and privately-operated audio/video capture devices.

Furthermore, the built-in microphones of the personal devices are configured to capture audio from the operating users or conference participants. In some instances, the built-in microphone of the personal device may also capture the local audio playback of remote audio received through the conferencing network and played via the local hub. In order to accurately detect active participants in a local room and send the local audio to remote locations, the captured audio stream should not include sound arising from the local playback of remote audio. To this end, an acoustic echo cancellation (AEC) mechanism may be utilized in accordance with one example of the present invention as will be shown and described with reference to FIG. 2.

Figure 2:
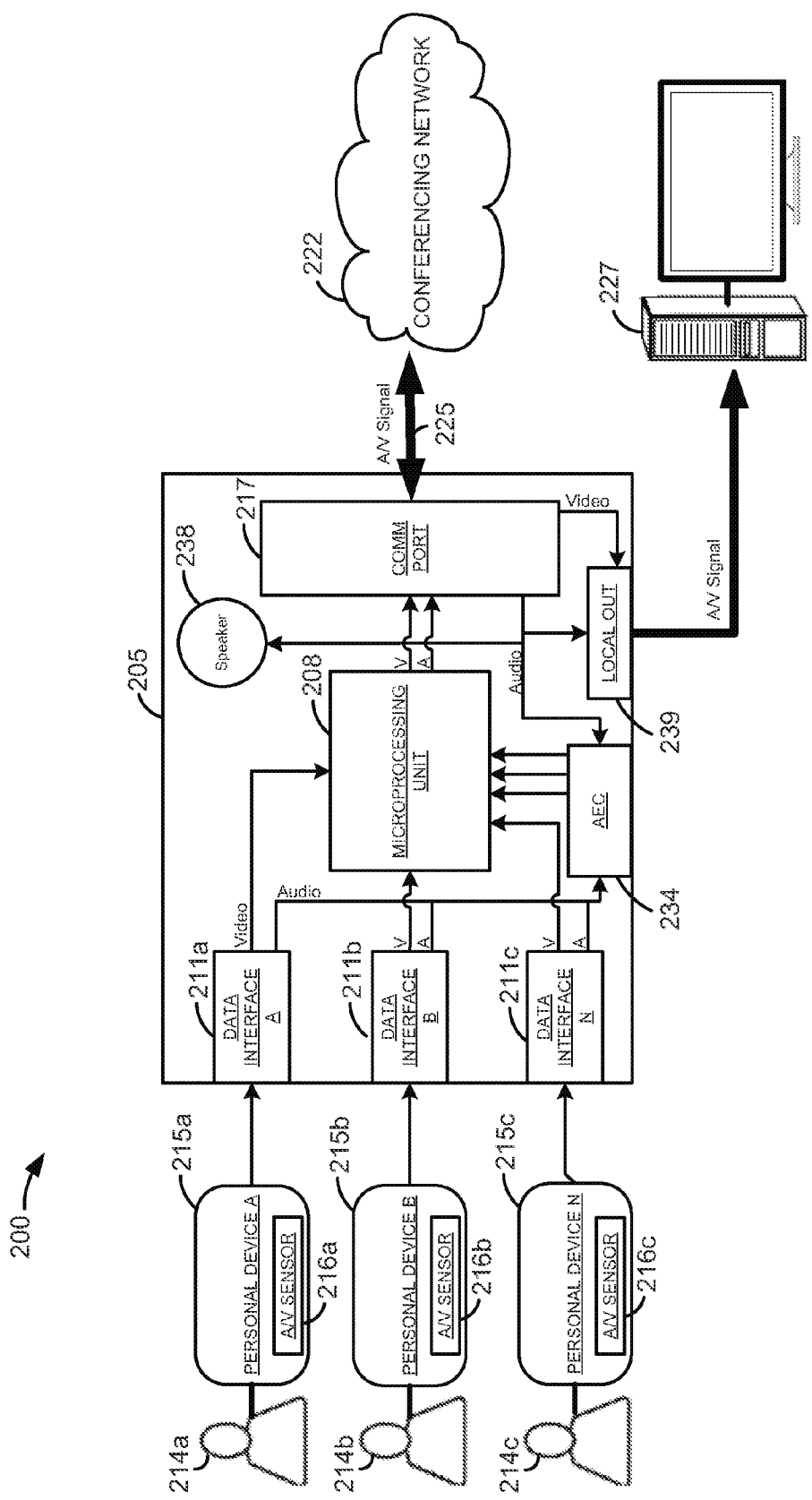
FIG. 2 is a simplified block diagram of a distributed meeting capture system according to an example of the present invention.

FIG. 2 is a simplified block diagram of a distributed meeting capture system according to an example of the present invention. As shown here, the distributed meeting capture system 200 includes multiple personal devices 215a-215c, a media hub 205, an external device 227, and a conferencing network 222. In particular, personal devices 215a-215c represent a portable electronic device owned and operated by at least one conferencing participant or user such as a personal notebook computer, a personal tablet personal computer, or a personal srnartphone device for example. Furthermore, each personal device 215a-215c includes audio and video capture sensors 216a-216c, which may represent a combination of optical cameras (e.g., high resolution image, low resolution video) and microphones. However, the sensors 216a-216c may also include three-dimensional sensors (e.g., time of flight, stereo-pair) or a device that combines video and audio capture. Namely, the audio-visual sensors 216a-216c should be configured to capture audio data and video data associated with a user operating the associated personal device. For example, audio-visual sensor 216a is configured to capture the lip motion activity (i.e., visual data) and voice activity (i.e., audio data) of the operating user 214a associated with personal device 215a. Though only three personal devices are depicted, the distributed meeting capture system of the present example may include support for more or less than three personal devices (i.e., personal device A-personal device N).

Still further, a plurality of data interfaces 211a-211c are provided for interfacing with the plurality of personal devices 215a-215c. According to one embodiment, each data transfer interface 211a-211c may provide a wired connection between the media hub 205 and the personal devices 215a-215c. For example, the data interface may represent a universal serial bus (USB) interface or an IEEE 1394 interface in which coupling between devices is provided via a data cable. Alternatively, the data interfaces 211a-211c may represent a wireless connection so as to provide cable-free connectivity between the personal devices 215a-215c and the local media hub 205. As shown here, each data interface 211a-211c is configured to transmit internally both a video stream (V) and an audio stream (A) for further processing. When an AEC unit 234 is utilized, video streams from each data interface may be sent to the microprocessing unit 208, while the audio streams are sent to the AEC unit 234 for preprocessing as will be appreciated by those skilled in the art.

The microprocessing unit 208 is configured to perform pre-processing of the sensor data received from a personal device, and then transmit at least one audio and video stream that fits the bandwidth requirements of the local hub 205. That is, the microprocessing unit 208 of the media hub 205 is configured to receive and decode all audio-visual streams from the personal devices 215a-215c (and AEC unit 234 if utilized) and then perform intelligent processing to create one or more outgoing audio-visual (AV) streams 225 for output to the conferencing network 222. In one embodiment, the outgoing AV stream is a mono-view view, single-channel audio AV stream and is sent via the communication port 217. In an alternative embodiment, the outgoing AV stream is a multi-channel audio/multi-channel video AV stream. Still further, the multiprocessing unit 208 and communication port 217 are configured to receive as input one or more AV bit streams from the conferencing network 222. As shown, the received AV bit streams include a remote audio stream and a remote video stream to be transmitted from the communication port 217 and output via a local output port 239 for presentation and display on a connected external device 227 such as a projector screen for example. Additionally, the remote audio stream may be sent to the AEC 234 for preprocessing or to an internal loudspeaker 238 for local playback. The conferencing network represents an IP video conferencing infrastructure that includes one or more remote conferencing participants.

Figure 3:
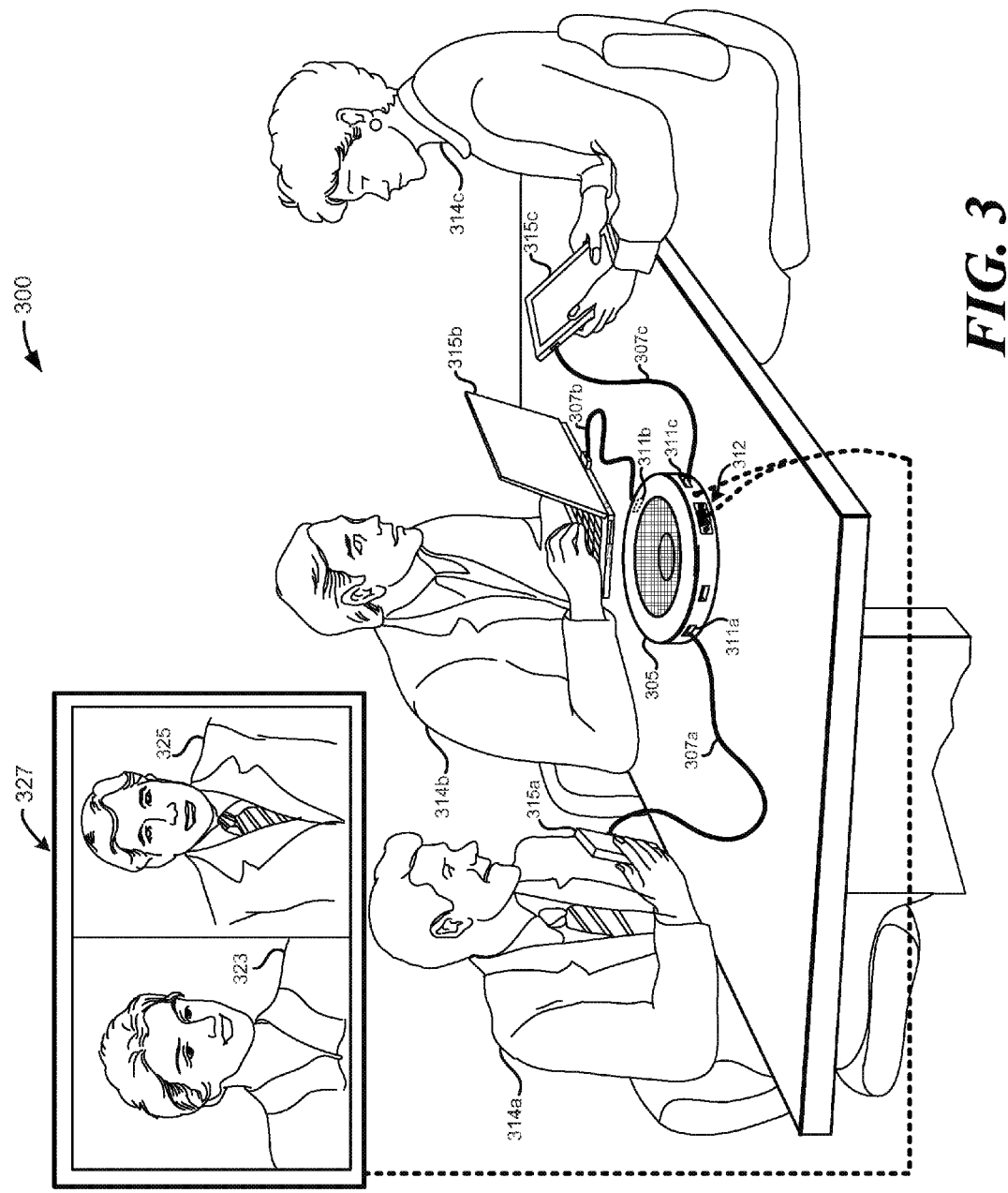
FIG. 3 is a three-dimensional view of an operating environment utilizing the distributed meeting capture system according to an example of the present invention.

FIG. 3 is a three-dimensional view of an operating environment utilizing the distributed meeting capture system according to an example of the present invention. The distributed meeting capture system 300 includes a multitude of participating users 315a-315c operating respective personal devices 310a-310c. As shown in the present example, each personal device 310a-310c is connected to the media hub 305 via data cables 307a-307c. However, as described above, personal devices 310a-310c may also be connected to the media hub 305 wirelessly. Again, each personal device 315a-315c is equipped with a camera (i.e., video capture sensor) and microphone (i.e., audio capture device). In accordance with one example, one audio capture sensor and one video sensor is associated with each conferencing participant or user. Alternatively, multiple participants or users may be associated with a single audio-video sensor and personal device. Still further, the distributed meeting capture system is configured to operate with a diverse set of personal devices such as a smart phone (i.e., personal device 310a), a notebook computer (i.e., personal device 310b), or a table personal computer (i.e., personal device 310c). According to one example, audio data and video data can be transmitted from the personal devices 310a-310c to the media hub 305 in either a compressed or uncompressed format.

The media hub 305 further includes output ports 312 for presenting received audio-visual streams on an external device such as a projector screen 327 for example. As shown here, the projector screen 327 currently displays both a remote participant 323 and a local participant 325. In the present example, the local participant 325 is active user 315b operating personal device 310b within the local conference room, while the remote participant 323 is another active user from a remote location (i.e. via received data from the comm. port of the local hub). Additionally, the media hub 305 is configured to perform intelligent view switching and recomposition on the multiple input audio/video streams received from personal devices 310a-310c. In the present example, three personal devices are shown and thus all three associated AV streams are collected by the hub 305. However, there may be difficulty in the simultaneous transmission of all three (or more) AV streams over a bandwidth-constrained network. In such a case, internal pre-processing is performed by the media hub 305 prior to data being transmitted over the network. More importantly, the media hub 305 is configured to determine at least one active user or talker amongst the plurality of users as will be described in further detail below with reference to FIG. 4.

Figure 4:
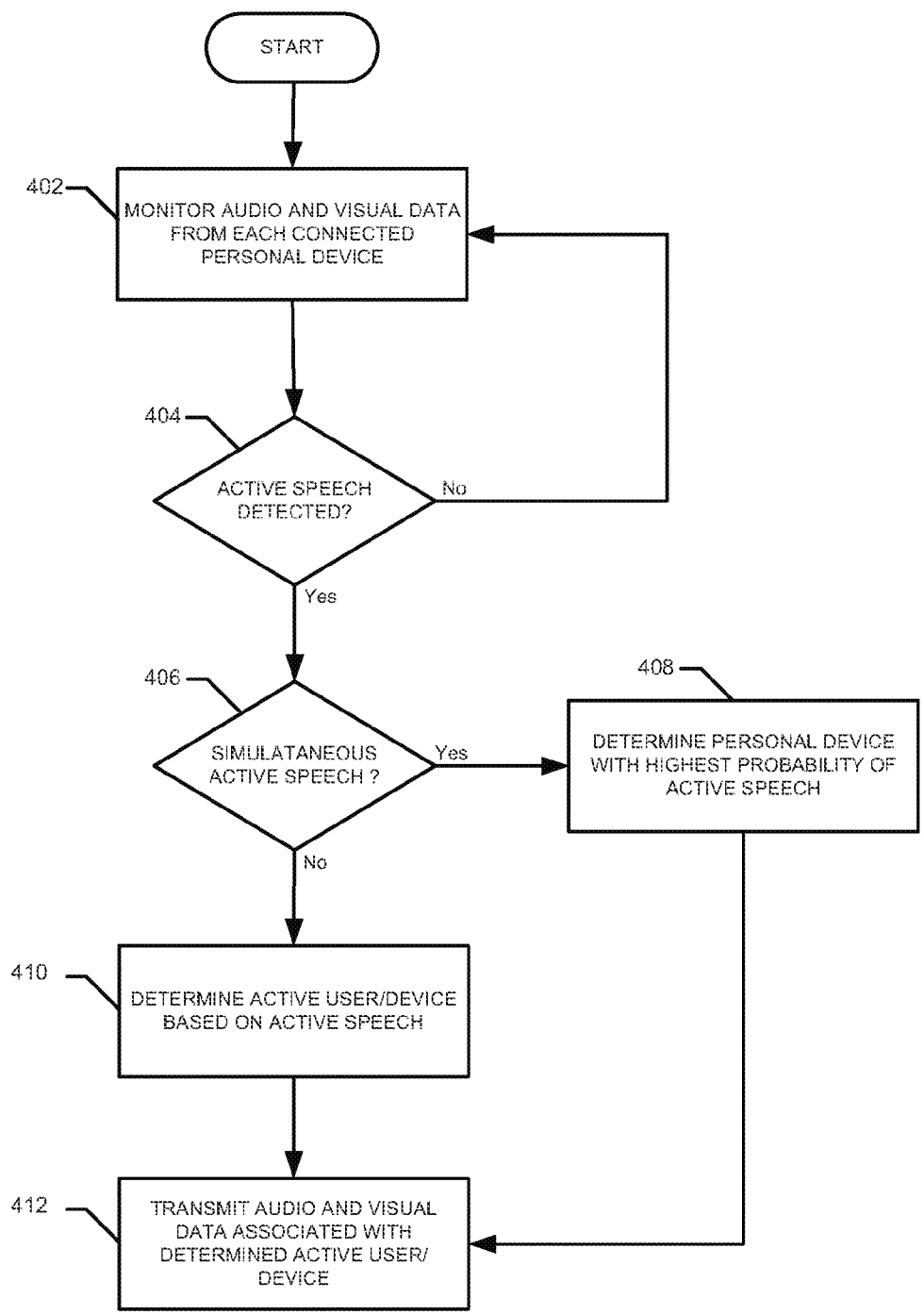
FIG. 4 is a simplified flow chart of the processing steps implementing the distributed meeting capture system according to an example of the present invention.

FIG. 4 is a simplified flow chart of the processing steps implementing the distributed meeting capture system according to an example of the present invention. In step 402, the microprocessing unit monitors the audio data and visual data received from each personal device connected (wired or wirelessly) to the local media hub. Next, in step 404, the microprocessing unit determines whether one of the participating users operating a connected personal device is actively speaking. More particularly, the microprocessing unit is configured with an algorithm that monitors the lip motion activity from the received visual data of the personal device. Based on the detected lip motion activity, the personal device associated with the active speaker is then determined as the active device in step 410. However, if it is determined that multiple users are simultaneously speaking (i.e., simultaneous active speech) in step 406, then the microprocessing unit of the media hub determines, amongst the simultaneous active speakers, the user and associated personal device having the highest probably of active speech in step 408. Specifically, based on the captured audio and video data, the microprocessing unit determines the probability of active speech ($p_A$, $p_B$ ... $p_N$), where the probability of active speech is a function of voice activity probability captured by the audio capture sensor of the respective personal device and the lip motion probability captured by the video capture sensor of the respective device. For example, active talkers speaking at a high rate (e.g., words per minute) will be assigned a high lip motion probability by the microprocessing unit, while active talkers speaking with a loud voice or inflection will be assigned a higher voice activity probability than whispering or soft voiced users speaking simultaneously. These two probabilities may be analyzed to determine the probability of active speech for each user ($p_A$, $p_B$ ... $p_N$). Thereafter, in step 412, the audio data and visual data is combined into an audio-visual stream for transmission across the conferencing network. Additionally, the layout of the outbound audio-video stream may be automatically configured based on the combined probability of active speech ($p_A$, $p_B$ ... $p_N$) of each participant, and their progression in time.

Examples of the present invention provide a system and method for distributed meeting capture. Furthermore, many advantages are afforded by the distributed meeting capture system of the present examples. For instance, the system and method may collect multiple audio/video streams via conventional data transfer means such as USB or IEEE 1394, thus providing flexibility and scalability for multi-view meeting capture. Most personal devices such as notebook, tablet PC, slate, etc., are already equipped with a camera (video capture) and microphone (audio capture), so no additional hardware is required for operation. Still further, the distributed meeting capture system can be easily upgraded simply by upgrading the personal devices without having to engage in costly upgrades of the hub itself.

Furthermore, while the invention has been described with respect to exemplary embodiments, one skilled in the art will recognize that numerous modifications are possible. For example, although exemplary embodiments depict particular portable electronic devices as representing the personal device, the invention is not limited thereto. For example, the personal device may be a netbook, a cell phone, a desktop personal computer or any other electronic device having video capture and audio capture functionality.

Though the loudspeaker, output ports and input ports are shown as formed along the side portion of the media hub, examples of the present invention are not limited thereto. For example, the loudspeaker may be formed along the side surface of the hub, while the input ports and output ports are formed on the top or bottom surface areas of the hub device. Thus, although the invention has been described with respect to exemplary embodiments, it will be appreciated that the invention is intended to cover all modifications and equivalents within the scope of the following claims.

What is claimed is:

1. A distributed meeting capture system comprising:
    a plurality of personal devices within a meeting area, wherein each personal device a portable device owned and operated by a user and configured to capture video data and audio data associated with at least one operating user; and
    a media hub located within the meeting area and including a plurality of I/O ports for physically connecting to the plurality of personal devices and configured to receive video and audio data associated with a connected personal device, wherein the media hub includes a loudspeaker formed on an outer surface area thereof and configured to playback audio data received from the conferencing network;
    wherein the media hub is configured to collect the video data and/or audio data from the plurality of personal devices and selectively outputs at least one audio-visual data stream for facilitating video conferencing over a network based on the collected video data and/or audio data from the plurality of personal devices.

2. The distributed meeting capture system of claim 1, wherein each personal device of the plurality of personal devices includes a video capture sensor for capturing the video data associated with the at least one operating user, and an audio capture sensor for capturing the audio data associated with the least one operating user.

3. The distributed meeting capture system of claim 1, wherein the media hub includes a processing unit configured to select at least one audio-visual data stream associated with an active device for output.

4. The distributed meeting capture system of claim 3, wherein the at least one selected audio-visual data stream associated with the active device is determined based upon a probability of active speech ($p_A$, $p_B$ ... $p_N$) associated with the plurality of personal devices,
    wherein the probability of active speech is a function of a voice activity probability captured by the audio capture sensor and/or a lip motion probability captured by the video capture sensor.

5. The distributed meeting capture system of claim 4, wherein the individual audio-visual data stream associated with the personal device having the highest probability of active speech is automatically output over the network.

6. The distributed meeting capture system of claim 1, wherein the personal device is a notebook personal computer, a smartphone, or a tablet personal computer.

7. The distributed meeting capture system of claim 1, wherein the plurality of personal devices are connected to the media hub via data cables.

8. A method for distributed meeting capture, the method comprising:
    monitoring audio data and visual data from a plurality of personal devices; wherein each of the plurality of personal devices are belong to an operating user and are physically connected to a local hub having a loudspeaker and within close proximity to the personal devices;

detecting active speech from at least one personal device from the plurality of personal devices;

determining an active personal device based on the active speech; and transmitting, via the local hub, an audio-visual data stream associated with the determined active personal device so as to facilitate video conferencing over a conferencing network.

9. The method of claim 8, further comprising:

detecting active speech from a plurality of personal devices;

determining a probability of active speech ($p_A, p_B \ldots p_N$) associated with the detected personal devices.

10. The method of claim 9, wherein each personal device of the plurality of personal devices includes a video capture sensor for capturing the video data associated with the operating user, and an audio capture sensor for capturing the audio data associated with the operating user.

11. The method of claim 10, wherein the probability of active speech is a function of a voice activity probability captured by the audio capture sensor and/or a lip motion probability captured by the video capture sensor.

12. The method of claim 11, further comprising:

automatically outputting an individual audio-visual stream associated with the personal device having the highest probability of active speech.

13. The method of claim 8, further comprising:

performing echo cancellation on audio streams received from the plurality of personal devices and/or audio streams received from the conferencing network.

14. The method of claim 8, wherein the personal device is a notebook personal computer, a smartphone, or a tablet personal computer.

15. An apparatus for distributed meeting capture, the apparatus comprising:

a housing;

a plurality of I/O ports formed on an outer periphery of the housing and configured to receive video data and audio data from a plurality of physically connected personal devices, wherein each connected personal device is owned and operated by a user;

a loudspeaker formed on a to area of the housing and configured to output audio data received from remote active participants via the video conferencing network; and a microprocessor configured to select an individual audio-visual data stream based on the received video data and/or audio data from the plurality of personal devices for output over a video conferencing network, wherein the apparatus is positioned in dose proximity and within the same meeting area as the plurality of connected personal device.

* * * * *

UNITED STATES PATENT AND TRADEMARK OFFICE
CERTIFICATE OF CORRECTION

| | |
|---|---|
| PATENT NO. | : 8,451,315 B2 |
| APPLICATION NO. | : 12/956033 |
| DATED | : May 28, 2013 |
| INVENTOR(S) | : Bowon Lee |

It is certified that error appears in the above-identified patent and that said Letters Patent is hereby corrected as shown below:

In the Claims

In column 8, line 16, in Claim 15, before "area" delete "to" and insert -- top --, therefor.

In column 8, line 24, in Claim 15, delete "dose" and insert -- close --, therefor.

Signed and Sealed this
Third Day of September, 2013

Teresa Stanek Rea
*Acting Director of the United States Patent and Trademark Office*